US007043659B1

(12) United States Patent
Klein et al.

(10) Patent No.: US 7,043,659 B1
(45) Date of Patent: May 9, 2006

(54) SYSTEM AND METHOD FOR FLEXIBLE PROCESSING OF MANAGEMENT POLICIES FOR MANAGING NETWORK ELEMENTS

(75) Inventors: Gary R. Klein, Folsom, CA (US); Khaled M. Sakak, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 479 days.

(21) Appl. No.: 09/945,111

(22) Filed: Aug. 31, 2001

(51) Int. Cl.
G06F 11/00 (2006.01)
(52) U.S. Cl. ............................................. 714/4; 714/26
(58) Field of Classification Search ................. 714/26, 714/4, 2; 713/201
See application file for complete search history.

(56) References Cited

OTHER PUBLICATIONS

Derfler, Jr., Frank J. and Les Freed, How Networks Work, 2000, QUE Publishing, Millennium Edition, pp. 56-57.*
U.S. Appl. No. 09/345,634 Fault Management System and Method, Marteen Tentij et al., filed Jun. 30, 2001.
U.S. Appl. No. 09/770,427 System and Method for Managing a Communication Network Utilizing State-Based Polling, Semih Secer, filed Jan. 26, 2001.
U.S. Appl. No. 09/816,693 Object-Driven Network Management System Enabling Dynamically Definable Management Behavior, Semih Secer, filed Mar. 22, 2001.
U.S. Appl. No. 09/945,112 User-Friendly System and Method for Defining Policies for Managing Network Elements, Gary R. Klein et al., filed Aug. 31, 2001.
U.S. Appl. No. 09/945,372 System and Method for Defining Management Policies for Managing Network Elements, Gary R. Klein et al., filed Aug. 31, 2001.

\* cited by examiner

Primary Examiner—Robert Beausoliel
Assistant Examiner—Marc Duncan

(57) ABSTRACT

A system and method are disclosed which enable flexibility in configuring management behavior of a management system. More specifically, according to a preferred embodiment, management behavior is controlled by management policies that specify management actions to be performed for managing a communication network, for example. A user may specify the management actions to be performed by a management policy and the process flow to be utilized by the management policy in performing such management actions. Thus, not only are the particular management actions to be performed by the management policy configurable by the user, but the process flow in performing such management actions is also configurable by the user. Accordingly, the user has great flexibility in configuring the behavior of a management policy as desired.

24 Claims, 6 Drawing Sheets

FIG. 5

501 — POLICY OBJECT

502 — ATTRIBUTES:
POLICY NAME: CORRELATION POLICY FOR FOLSOM ROUTER

IDENTIFYING ATTRIBUTES

503

| ALARM NAME | A1 |
|---|---|
| MO NAME | MO1 |
| LOCATION | FOLSOM, CO |

PROCESS LIST:

504
CORRELATION_1
LOG
GENERATE ALERT
CORRELATION_2

BEHAVIOR LIST:

505
MANUAL_CLEAR
ALERT ACKNOWLEDGE
CHANGE SEVERITY

SYSTEM AND METHOD FOR FLEXIBLE PROCESSING OF MANAGEMENT POLICIES FOR MANAGING NETWORK ELEMENTS

CROSS-REFERENCE TO RELATED APPLICATIONS

This application is related to co-pending application entitled "FAULT MANAGEMENT SYSTEM AND METHOD," assigned Ser. No. 09/345,634, filed Jun. 30, 1999; co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR MANAGING A COMMUNICATION NETWORK UTILIZING STATE-BASED POLLING," assigned Ser. No. 09/770,427, filed Jan. 26, 2001; and co-pending application entitled "OBJECT-DRIVEN NETWORK MANAGEMENT SYSTEM ENABLING DYNAMICALLY DEFINABLE MANAGEMENT BEHAVIOR," assigned Ser. No. 09/816,693, filed Mar. 22, 2001, all of which are assigned to a common assignee and the disclosures of which are hereby incorporated herein by reference. This application is also related to concurrently filed application entitled "SYSTEM AND METHOD FOR DEFINING MANAGEMENT POLICIES FOR MANAGING NETWORK ELEMENTS," assigned Ser. No. 09/945,372, and concurrently filed application entitled "USER-FRIENDLY SYSTEM AND METHOD FOR DEFINING POLICIES FOR MANAGING NETWORK ELEMENTS," assigned Ser. No. 09/945,112, all of which are assigned to a common assignee and the disclosures of which are hereby incorporated herein by reference.

BACKGROUND OF THE INVENTION

1. Technical Field

The present invention relates in general to network management systems, and more particularly to a system and method which enable a user to define the process flow of a policy that defines management behavior for managing a communication network.

2. Background

The information-communication industry is an essential element of today's society, which is relied upon heavily by most companies, businesses, agencies, educational institutions, and other entities, including individuals. As a result, information service providers such as telephone, cable, and wireless carriers, Internet Service Providers (ISPs) and utility companies all have the need to deploy effective systems suitable for servicing such a demand. Accordingly, network management and operations have become crucial to the competitiveness of communication companies, utilities, banks and other companies operating Wide Area Networks (WANs) of computer devices and/or other network types and devices, including SONET, Wireline, Mobile, Internet Protocol (IP) devices, etcetera. For instance, many companies currently use customized "legacy" network management systems (NMSs) and operations support systems (OSSs). Various implementations of NMSs/OSSs are available in the prior art for managing networks and network elements.

Thus, management systems ("MSs," which encompass both NMSs and OSSs) have been implemented in the prior art for managing communication networks and network elements. Given that it is often desirable to manage various network elements (e.g., various types of devices, including without limitation routers, switches, computer equipment, etcetera), various types of management systems have been developed for managing such elements.

One area of management involves fault management. Fault alarm incidents (or messages) are routinely generated for the various components of a network to allow the service provider (or system administrator) to monitor the operational state of the network. Fault management systems generally receive and process these alarm incidents in accordance with fault management objectives as defined by the service provider.

Customers often desire to configure the management system in a particular manner for managing their network and/or network elements. That is, customers often desire to configure the management system to implement a desired management behavior. For example, a customer may desire to configure the management system to generate an alert to an alert display in the event that a particular alarm is detected for a certain network element. As other examples, a customer may desire to configure the management system to implement such behaviors as alert suppression, correlation, thresholding, logging, and other management behaviors, as are well known in the art.

Traditionally, configuring the management system to implement a desired management behavior, such as a desired alert generation, required development of software code that is executable to perform the desired management behavior. Such software code may, for example, be written in a programming language, such as C, C++, Pascal, BASIC, or other programming language known in the art. Because the customer generally does not have access to the source code of the management system, the customer may be required to develop independent code that is capable of interacting with the management system to implement the desired management behavior, or (more typically) request that the provider of the management system develop such code that implements the desired management behavior into the management system.

More recently, management systems have been developed that enable a customer limited ability to configure management behavior thereon. More specifically, management systems have been developed that include an interface program with which a customer may interact to configure, at least to a limited extent, the management behavior of the management system. For example, an interface program may be included that enables a user to input rules that are to govern the behavior of the management system. Such rules may, for example, be written by the user in the form of relatively simple "IF THEN" statements. The rules may be input by the user to govern such management behavior as alert generation, correlation, suppression, thresholding, and logging, as examples. Once developed by the user, the MS may then execute such rules to manage the network elements in the desired manner. For instance, events detected for various network elements may be correlated in some manner (as may be specified by a user-defined rule) to enable the MS to perform a desired behavior (or task) upon detecting the specified correlation of events. Also, alarms relating to certain events may be suppressed (as defined by a user-defined rule) as such events may be residual events resulting from another event that has already been reported by the MS to the system administrator.

A threshold number may be specified for certain events (within a user-defined rule) to avoid generating alerts for events that are not actually indicative of a problem. For instance, a process that is suppose to be running within the network may be polled periodically by the MS to ensure that it is operational and responsive. Upon initially being polled, the process may be too busy to immediately respond to the poll. Accordingly, the non-responsiveness of the process may not be indicative of a situation for which an alert should be generated, but instead may only be the result of the process being busy with other tasks at the time it was polled. Thus, for example, a threshold may be defined to specify that an alert is to be generated only if the process fails to respond to three consecutive polls in order to avoid unnecessary generation of alerts.

As another example, a user-defined rule may specify that an alert is to be generated having a non-critical severity when a first set of conditions are encountered and such rule may further specify that the alert is to have its severity escalated to indicate critical severity upon a second set of conditions being encountered. For instance, 75% CPU utilization rate on a particular network element may, according to a user-defined rule, generate an alert of relatively minor severity, but upon the network element's CPU utilization rate increasing to 95% or greater, the rule may specify that the alert is to be escalated to critical severity.

As yet another example of management behavior that may be defined by a rule, event logging may be performed. That is, events detected by the MS for network elements may be logged to a file (e.g., to a database or other data structure for storing data). Those of ordinary skill in the art will recognize other management tasks in addition to the exemplary tasks described briefly above that may be defined in rules implemented on the MS to control the management of network elements by the MS. That is, user-defined rules may be implemented to configure the management behavior of the MS in various ways.

BRIEF SUMMARY OF THE INVENTION

More recently, management policies are used for managing the network elements. That is, management policies may be created within a MS to define how network elements are to be managed. In general, a management policy is a set of stored parameters that drive the decision-making of the MS. A management policy may be defined, for example, to instruct the MS that if a given alert is received, it should display the alert on an alert display screen, log the alert in a certain manner, and/or perform any number of other management tasks. For example, policies may be implemented to perform such tasks as correlation, suppression, thresholding, escalation of alert severity, logging of events, etcetera, for managing network elements. The MS may allow a user to create policies that define management behavior for managing the network elements, and the MS may then execute such policies to manage the network elements in the desired manner. For instance, events detected for various network elements may be correlated in some manner (as defined by a policy) to enable the MS to perform a desired behavior (or task) upon detecting the specified correlation of events. Also, alarms relating to certain events may be suppressed (as defined by a policy) as such events may be residual events resulting from another event that has already been reported by the MS to the system administrator.

A threshold number may be specified for certain events (within a policy) to avoid generating alerts for events that are not actually indicative of a problem. For instance, a process that is suppose to be running within the network may be polled periodically by the MS to ensure that it is operational and responsive. Upon initially being polled, the process may be too busy to immediately respond to the poll. Accordingly, the non-responsiveness of the process may not be indicative of a situation for which an alert should be generated, but instead may only be the result of the process being busy with other tasks at the time it was polled. Thus, for example, a threshold may be defined to specify that an alert is to be generated only if the process fails to respond to three consecutive polls in order to avoid unnecessary generation of alerts.

As another example, a policy may define that an alert is to be generated having a non-critical severity when a first set of conditions are encountered and the policy may further specify that such alert is to have its severity escalated to indicate critical severity upon a second set of conditions being encountered. For instance, 75% CPU utilization rate on a particular network element may, according to a defined policy, generate an alert of relatively minor severity, but upon the network element's CPU utilization rate increasing to 95% or greater, the policy may specify that the alert is to be escalated to critical severity.

As yet another example of management behavior that may be defined by a policy, event logging may be performed. That is, events detected by the MS for network elements may be logged to a file (e.g., to a database or other data structure for storing data). Those of ordinary skill in the art will recognize other management tasks in addition to the exemplary tasks described briefly above that may be defined in policies within the MS to control the management of network elements by the MS.

Existing network management systems may provide the system administrator a program, which may be referred to as a "policy builder," which provides an interface that enables at least limited ability for a user to create or modify management policies. That is, a user may interact with such policy builder program to specify, for example, certain network elements (which may be represented as objects) and define certain management tasks, such as correlation of events, suppression of alerts, thresholding, escalation of alert severity, event logging, etc., that are to be used in managing the specified network elements.

Once a policy is created and activated on a MS, the policy may work to perform the defined management tasks, such as generating alerts to a user display. For example, a system administrator may have one or more alert displays to which the MS presents alert messages to notify the system administrator of events detected by the MS. Such alerts may be generated in accordance with the policies defined for the MS. For instance, certain alerts may be suppressed, as specified by policies defined for the MS, and other alerts may be escalated in severity based on conditions being encountered as specified by a policy defined for the MS. Similarly, certain events detected on the network may be correlated in accordance with the defined policies, and certain alerts may be generated and/or suppressed based upon a particular correlation pattern specified by a defined policy being detected.

Existing MSs include policies that have a fixed, inflexible process flow for performing management behavior. While a user may specify which management tasks are to be performed within a policy (and/or the conditions in which such tasks are to be performed), the process flow of the policy is inflexible and may not be altered by a user. For example, the following management tasks may be available within a policy (for selection by a user for implementing such tasks): alert generation, event logging, correlation of events, escalation of alert severity, and thresholding. Of course, in a particular MS implementation, policies may make available to a user various other management tasks, such as alert suppression, interacting with a trouble-ticketing application to generate a trouble-ticket, and/or other management tasks that are well known in the art. In existing MSs, policies execute according to a fixed, inflexible process flow that effectively steps through each of the available management tasks (in a fixed, inflexible order), and at each step determines whether the management task is to be performed based on user-defined parameters specified in the policy. For instance, policies may execute according a process flow that steps sequentially through the management tasks of alert generation, event logging, correlation of events, escalation of alert severity, and thresholding in that order. Upon encountering each management task available in the policy, the policy determines whether such task is to be performed based upon user-defined parameters.

For example, suppose a user defines a policy that is to generate an alert upon a particular incident being detected for a network element. Upon such incident being detected by the MS, the policy is executed to generate the alert as defined therein by the user. However, in existing MSs, the policy will further execute to step through the other management tasks that are available through the policy according to its fixed, inflexible process flow. Thus, the policy steps through its process flow to determine whether each of the available management tasks is to be invoked, even though the user has only specified that one of the management tasks is to be performed. Accordingly, policies of existing MSs may be inefficient and may unnecessarily consume processing resources.

As another example, suppose again that policies execute according a process flow that steps sequentially through the management tasks of alert generation, event logging, correlation of events, escalation of alert severity, and thresholding in that order. Further suppose that a user desires to configure a policy to perform event logging and then generate an alert (in that order) upon detection of a particular incident for a network element. Such an option is generally not available to the user, as the policy process flow is fixed and inflexible. That is, a user may not define a process flow for performing management tasks within a policy, but instead is limited to performing management tasks according to the fixed operational flow for policies.

Further, continuing with the above example, suppose a user desires to have two different types of event correlation performed by a policy upon detection of a particular incident for a network element. Such an option is generally not available to the user, as the policy process flow in this example provides for only one correlation task within the process flow. That is, each step of the process flow may allow a user to specify a single management task of a particular type to be performed, but does not allow the user the flexibility of defining multiple management tasks of a particular type (at one step of the process flow). More specifically, existing MSs do not allow a user to modify the policy process flow to insert an additional (or repeated) management task into such process flow.

In view of the above, the process flow of policies that define management behavior within existing MSs is fixed and inflexible. Accordingly, a desire exists for a system and method that enable flexible process flow of policies. More specifically, a desire exists for a system and method that enable a user to define a desired process flow for a policy, thereby enabling greater flexibility as to how the user may configure management of a communication network.

The present invention is directed to a system and method which enable flexibility in configuring management behavior of a management system. More specifically, according to a preferred embodiment, management behavior is controlled by a management policy, and a user may specify the management actions to be performed by the management policy and the process flow to be utilized by the management policy in performing such management actions.

According to one embodiment of the present invention a method is disclosed for defining a management policy for controlling behavior of a management system. The method comprises the step of executing a program on a processor-based device that presents a user interface for defining the management policy. The method further comprises the step of receiving input from a user identifying management action to be performed by the management policy, and receiving input from a user specifying a process flow for the management policy to utilize in performing the management action.

As an example, in an embodiment of the present invention, a management policy may be invoked responsive to detection of a particular fault condition detect for at least one network element. A software object may be implemented for defining the management policy, wherein at least one attribute of the software object identifies such circumstance in which the management policy is to be invoked. Upon being invoked a user-defined management process may be executed according to a user-defined process flow. More specifically, a process list attribute may be included in the software object that specifies management actions to be performed upon invocation of the policy object, as well as a particular process flow to utilize in performing such management actions. For example, a user may define that responsive to detection of a particular fault condition for a particular network element, a management policy is to be invoked to perform a particular type of correlation, log the fault condition to a database, and then generate an alert to an alert display. Not only are the particular management actions to be performed by the management policy configurable by the user, but the process flow in performing such management actions is also configurable by the user. Accordingly, the user has great flexibility in configuring the behavior of a management policy as desired.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 shows an exemplary policy object that may be defined by a user in accordance with a preferred embodiment of the present invention.

DETAILED DESCRIPTION OF THE INVENTION

Figure 1:
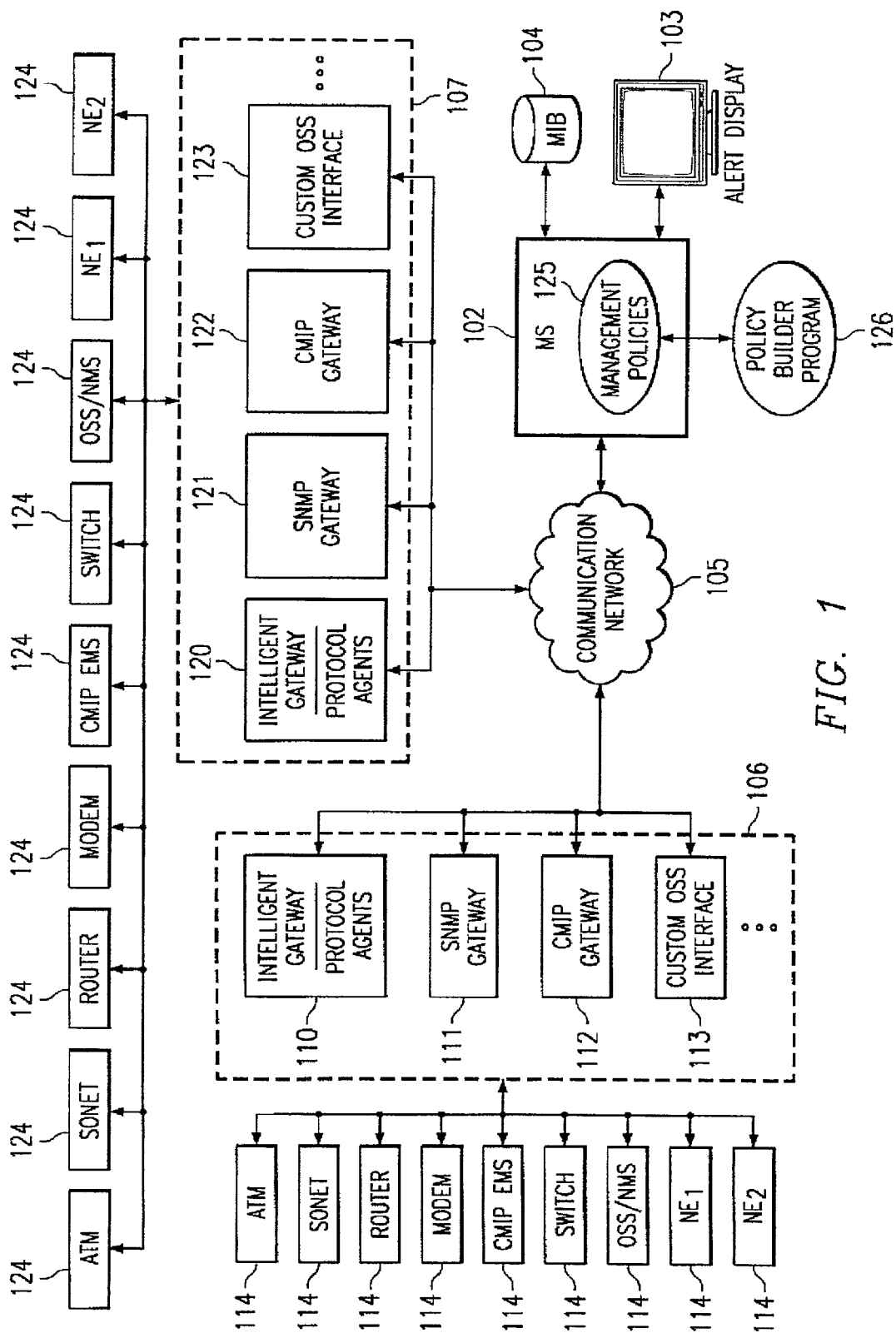
FIG. 1 shows an exemplary network management system in which embodiments of the present invention may be implemented.

Various embodiments of the present invention are described herein with reference to the above Figs., wherein like reference numerals represent like parts throughout the several views. To better appreciate the various embodiments for implementing management policies having flexible process flow as disclosed herein, it may be helpful for the reader to have an understanding of typical management system implementations. Accordingly, an exemplary management environment in which embodiments of the present invention may be implemented is shown in conjunction with FIG. 1 described below.

Given that it is often desirable to manage various network elements (e.g., various types of devices, including without limitation routers, switches, computer equipment, etc.), various types of management systems have been developed for managing such elements. Further, because different types of network elements may communicate in different protocols, management systems may utilize different processes for managing different types of network elements. For instance, processes that may be referred to as "gateway" processes are sometimes implemented in management systems for managing particular types of network elements. For instance, a Simple Network Management Protocol (SNMP) gateway process may be implemented for managing SNMP devices, and a Common Management Information Protocol (CMIP) gateway process may be implemented for managing CMIP devices. Thus, one or more gateway processes may be implemented for managing network elements that communicate in a particular communication protocol.

Such gateway processes may, for example, receive unsolicited messages from their respective network elements and/or may poll their respective network elements for certain information. MSs commonly recognize faults (or "traps") generated within the network and/or utilize polling of the network elements to provide management. For example, IP and SNMP devices may generate fault messages (which may be referred to as traps), which are unsolicited messages that may be received by the management system. Examples of such trap messages include messages that indicate a network element's CPU utilization is too high, a network element just rebooted, available data storage capacity is low on a network element, and an interface on a network element is down, as examples. Various other types of unsolicited trap messages may be generated by a network element and received by a MS, as those of ordinary skill in the art will recognize. Such messages are generally generated in a defined protocol, such as SNMP, which the management system can recognize (e.g., a gateway process may recognize) to process the received messages.

Some management systems may desire information regarding the performance of network elements that is not provided through unsolicited messages generated by such network elements. In such case, gateways may be implemented to poll their respective network elements for particular information. For instance, a gateway may be implemented to poll its respective network element(s) to gather information about various operational characteristics of such network element(s). Gateways of management systems are typically implemented to periodically poll their respective network elements according to pre-set time intervals. For instance, a gateway may be pre-set to poll its respective network element(s) once every five minutes or once every twenty minutes, as examples. Gateways typically poll network element(s) to request values for various variables detailing information about the operation/performance of the network element(s). For example, a gateway may periodically poll a network element to determine whether the network element is operational and responding to the poll. If a network element fails to respond to such a poll, such failure to respond may be indicative of a problem with the network element, such as the network element having a hardware or software failure. As other examples, a gateway may periodically poll a network element to determine the workload being placed on such network element, the network element's available memory capacity, etcetera.

Depending on the amount of intelligence implemented within such gateway process, it may evaluate the performance of its respective network elements (e.g., based on unsolicited messages and responses to polling) and may trigger certain actions as necessary to manage the network elements (e.g., which may be defined by a management policy). For instance, upon a fault message being received for a particular network element, the gateway process may generate an alert to a network administrator to notify the network administrator of such fault condition. As a further example, once a gateway receives the variable values from the network element(s) in response to a poll, the gateway may then process such variable values to monitor the operation of the network element(s). For instance, if a gateway polls a network element for a response and fails to receive such a response, the gateway may provide an alert to the network administrator (e.g., by presenting an alert message to a computer workstation) notifying the network administrator of a problem with the network element. Similarly, if a gateway polls a network element for its available memory and determines that such network element has little or no memory available, the network administrator may be alerted as to such condition. The management behavior of a gateway, such as alerting a user of particular conditions, may be defined by one or more policies implemented within the MS, which are described further below.

Gateways may be implemented in any of several different arrangements within management systems for polling and/or otherwise monitoring the operations of various network elements. As one example, gateways may be implemented in a non-distributed manner within a MS for managing network elements. However, such a non-distributed approach may place a great operational burden on the MS and may result in congestion of communication traffic to/from such MS. Accordingly, in some management systems, such as that disclosed in co-pending patent application Ser. No. 09/770,427 entitled "SYSTEM AND METHOD FOR MANAGING A COMMUNICATION NETWORK UTILIZING STATE-BASED POLLING" and co-pending application Ser. No. 09/816,693 entitled "OBJECT-DRIVEN NETWORK MANAGEMENT SYSTEM ENABLING DYNAMICALLY DEFINABLE MANAGEMENT BEHAVIOR," the gateways may be distributed from the MS to ease the operational burden on the MS. At least one embodiment of the present invention may be implemented with distributed gateways for managing network elements.

An example of such a distributed approach for a management system is shown in FIG. 1, which is described herein below. In certain embodiments, state models may be defined/altered by a user (e.g., a system administrator) at a central management system and then pushed out to the distributed gateways, an example of which is further described in co-pending patent application Ser. No. 09/770,427 entitled "SYSTEM AND METHOD FOR MANAGING A COMMUNICATION NETWORK UTILIZING STATE-BASED POLLING," the disclosure of which has been incorporated herein by reference. For instance, state models may be defined/altered by a user at a centralized MS and then pushed out to one or more distributed gateways via a suitable communication network that communicatively couples the centralized MS to such distributed gateways. Of course, in alternative embodiments state models may not be used for management within the gateways.

As shown in FIG. 1, central MS 102 may be communicatively coupled to numerous gateways distributed about the network for managing various network elements. Central MS 102 may be any suitable processor-based device, such as a personal computer (PC) or mainframe computer, as examples. In certain embodiments, MS 102 may comprise multiple processors. For example, as described more fully in co-pending U.S. patent application Ser. No. 09/345,634 entitled "FAULT MANAGEMENT SYSTEM AND METHOD," may be implemented in accordance with the standard Telecommunication Network Management (TMN) architecture promulgated by the International Telecommunications Union. More specifically, in accordance with the TMN standard, MS 102 may effectively include four different abstract layers for managing a network: (1) business management layer, (2) service management layer, (3) network management layer, and (4) element management layer. As described in FAULT MANAGEMENT SYSTEM AND METHOD, management processors may be implemented at each layer and gateways may be utilized to enable communication between the layers.

As shown in FIG. 1, central MS 102 may be communicatively coupled to distributed gateways or groups of distributed gateways via communication network 105. Communication network 105 may be any suitable type of communications network including, but not limited to direct computer to computer connection, a wide area network (WAN), modem to modem connection, the Internet, a combination of the above, or any other communications network now known or later developed within the networking arts which would permit communication between centralized MS 102 and distributed gateways.

For example, gateway group 106 may be implemented at one geographic location of a managed network and group 107 may be implemented at another geographic location of such managed network. Group 106 may include various gateways for monitoring (e.g., polling and receiving unsolicited messages) particular types of network elements. For instance, each gateway within group 106 may monitor network elements having particular communication protocols, including as examples intelligent gateway 110, SNMP gateway 111, CMIP gateway 112, and custom OSS interface gateway 113, which may monitor various network elements 114, such as ATMs, Sonets, routers, modems, CMIP EMSs, switches, OSSs/NMSs, as well as various other network elements local to group 106. Likewise, group 107 may include various gateways for monitoring (e.g., polling and receiving unsolicited messages) particular types of network elements. Each gateway of group 107 may monitor network elements having particular communication protocols, including as examples intelligent gateway 120, SNMP gateway 121, CMIP gateway 122, and custom OSS interface gateway 123, which may monitor various network elements 124, such as ATMs, Sonets, routers, modems, CMIP EMSs, switches, OSSs/NMSs, as well as various other network elements local to group 107. Each of the distributed gateways may, for example, be any suitable processor-based device operable to manage (e.g., receive unsolicited messages and/or poll) its respective network elements. The gateways may each include, among other things, a rule engine for (1) identifying, parsing, and normalizing incoming incidents, and (2) performing basic processing tasks.

Normalizing involves translating (or mapping) a received incident (or message) into a suitable, consistent form (e.g., ASCII), which may be discernable within the entire management system. Identifying and parsing involves identifying the incident's source and associated management level so that it may be processed in the correct management processor (i.e., the processor for the element layer, network layer, service layer, or business layer of MS 102. Most (but not all) of the incidents received from network elements, such as network elements 114 and 124 in FIG. 1, will be element layer incidents because these incidents correspond to signals from the physical network "elements." However, in a preferred embodiment, incidents are not exclusively generated within the physical network itself. Rather, management processors included at higher level layers (such as the network layer, service layer, and/or business layer of a MS) may also generate incidents for such higher level layers and pass them upward to the corresponding management processor. For example, a given customer may have contracted for premium accessibility. This would correspond to a service layer function or issue. A number of physical network or element layer elements responsible for providing this service may be impaired. However, the elements themselves are not capable (or even in a position) to communicate this "service" problem to the system. Thus, the element and/or network management processors may determine, from an aggregate of element and/or network alarm incidents, that this customer's premium service is impaired. An appropriate service alarm incident would then be generated and provided to the processor at the service management layer by the element and/or network management layer processors, respectively.

In certain implementations, a gateway, such as a gateway included in group 106, may also be capable of performing basic processing tasks. In certain implementations (as will be discussed in more detail below), configuration objects, which include both control and scenario objects, may be initiated and executed for performing management functions. Such configuration objects may be utilized by policies, for example, to implement the management behaviors defined by such policies. The gateway, with its processing capability, selects and at least partially processes an initial control object in response to a received incident. Basic control object processing may be performed in the distributed gateways with advanced processing being performed in the centralized MS 102.

In a preferred embodiment, data collected by the distributed gateways may be communicated to central MS 102. For example, polling services (which may include state models) may be loaded onto the distributed gateways of groups 106 and 107, and such gateways may execute the polling services to monitor their respective network elements. In this manner, the gateways can act as filters by only communicating necessary data about the network elements back to central MS 102, thereby alleviating much of the processing and communication traffic burden from central MS 102.

The management system of various embodiments of the present invention is preferably object-driven. An example of such an object-driven management system is further described in co-pending patent application Ser. No. 09/816,693 entitled "OBJECT-DRIVEN NETWORK MANAGEMENT SYSTEM ENABLING DYNAMICALLY DEFINABLE MANAGEMENT BEHAVIOR," the disclosure of which has been incorporated herein by reference. For instance, network elements and management behavior are preferably represented by objects within the management system. Such objects may be stored in management information base (MIB) 104, which may, for instance, be a database or other suitable data storage management. MIB 104 is communicatively coupled to central MS 102. More specifically, MIB 104 may be integrated within or external to central MS 102, and a management process executing on central MS 102 is capable of accessing MIB 104 to store/retrieve objects.

MS 102 includes management policies 125 executing thereon to define management behavior for MS 102 to utilize in managing the network elements 114 and/or 124. For example, such management policies 125 may define such management behavior tasks as performing correlation between certain events (or alarms or incidents) detected by gateways 110–113 and/or 120–123 for network elements 114 and/or 124, performing suppression of certain alerts, performing thresholding, performing alert escalation, performing event logging, as well as various other management behavior tasks as are well known in the art. Also, as shown in FIG. 1, one or more alert displays 103 (e.g., work stations equipped with input and output devices, such as a computer display) may be communicatively coupled to central MS 102 for enabling interaction with a user (e.g., a network administrator), including displaying of alerts in accordance with management policies 125. Also, a policy builder program 126 may be executing on MS 102 or on a processor-based device, such as a PC, that is communicatively coupled to MS 102. Policy builder program 126 provides an interface with which a user may interact to create management policies 125. However, such creation of management policies 125 is generally limited in traditional MSs in that the process flow of policies is fixed, rather than being user-defined.

Because various embodiments of the present invention utilize objects to define management behavior, the management system of such embodiments provides great flexibility in allowing objects to be created/modified in order to dynamically define management behavior. Additionally, objects may have an attribute specifying the relationship of such objects to the network elements and/or gateways. That is, a behavior object preferably includes a relationship attribute defining the relationship of the behavior within the managed network. Accordingly, upon an object being created/modified, the central MS may determine to which gateways and/or network elements the object relates and implement the management behavior defined by such object for the related network elements and/or gateways. For instance, a user (e.g., network administrator) may define a management behavior (e.g., within management policies, such as management policies 125 of FIG. 1). Examples of such management behavior that may be defined includes management behavior to be used responsive to particular trap messages, as well as management behavior for polling network elements.

In certain embodiments, the user may specify one or more distributed gateways, such as gateways 110–113 and/or 120–123, that need to execute the defined management behavior (e.g., need to respond to particular trap messages or perform defined polling activities), and such gateways may be identified in a relationship attribute of the object defining the management behavior. As a result, central MS 102 may communicate (e.g., "push") the created management behavior (e.g., the object defining such management behavior) to the appropriate gateways to which the management behavior relates. Thereafter, a user may modify the management behavior at the central MS 102 (e.g., by modifying management policies 125 via policy builder program 126), and such modification may be automatically communicated to the appropriate gateways.

FIG. 1 described above provides an exemplary environment in which embodiments of the present invention may be implemented. However, it should be recognized that embodiments of the present invention are not limited to the environment described in conjunction with FIG. 1, but may instead be implemented in any type of management system now known or later discovered.

Figure 2:
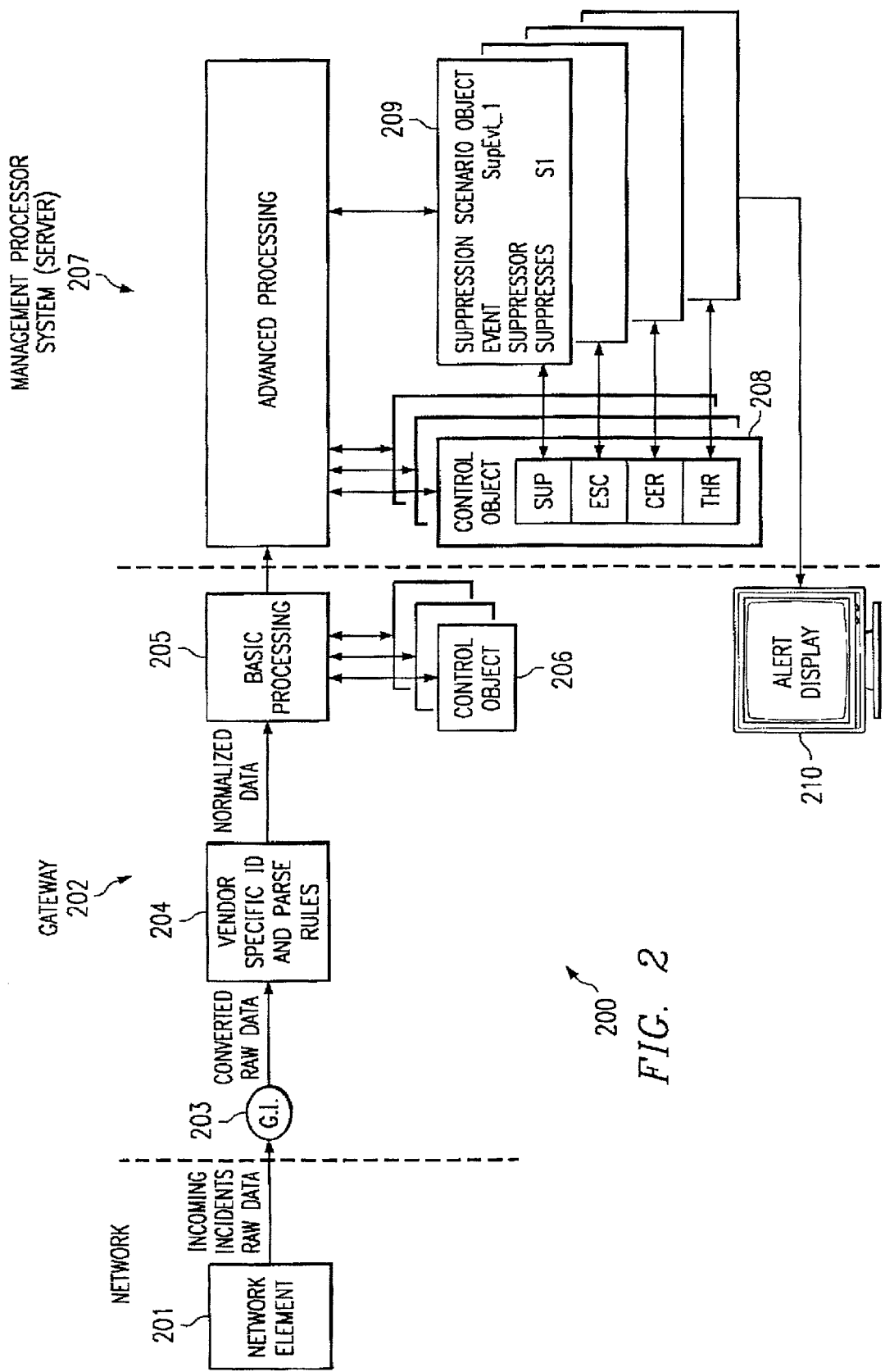
FIG. 2 shows an exemplary fault management system depicting the traditional processing flow of an incoming alarm.

FIG. 2 shows an exemplary fault management system (FMS) 200 with which the traditional processing flow of an incoming alarm is described. Among other things, the fault management system 200 may perform alarm surveillance, alarm clearing, reporting, correlation, suppression, escalation, and thresholding at all of the management layers: business, service, network, and element.

FMS 200 generally includes one or more gateways, as described above with FIG. 1, such as gateway 202. FMS 200 further comprises fault management processor system 207, and display terminal interface 210 for displaying to a user fault alerts (via an Alert Display) and for receiving from the user appropriate command and configuration information. Topological representations of the network and its state may also be included. Gateway 202 is interconnected between management processor system 207 and the network elements 201 for receiving incoming fault incidents from network elements and/or their respective element managers. Display terminal interface 210 may be connected to both gateway 202 and management processor system 207. As described above, gateway 202 may actually comprise a plurality of distributed gateways. Accordingly, display terminal interface 210 may comprise several display terminals for servicing fault management processor system 207.

FIG. 2 diagrammatically depicts an example of the processing flow of an incoming alarm incident. In operation, network element 201 sends a raw alarm incident to gateway 202 where it is received at gateway interface 203. It is passed to a normalization rule engine at 204 where it is normalized; that is, identification and parse rules are applied in order to translate it from a vendor specific form into a form that is amenable for processing throughout the system. Based on data from this normalized incident, gateway 202 then selects at 205 the "closest" control object 206 and processes it. In doing so, the rule engine selects the control object whose name most closely matches the normalized incident data. Such selection of the closest control object is further described in co-pending, U.S. patent application Ser. No. 09/345,634 entitled "FAULT MANAGEMENT SYSTEM AND METHOD." Once the control object is selected, the attributes in the control object determine how the alarm incident will be processed. In some cases, advanced processing in the management processing system 207 will be required. The processed control object may cause one or more other control objects 208 and/or any necessary scenario objects 209 (e.g., for performing correlation or suppression) to be processed. The management processing system 207 may then take appropriate action in accordance with the processed control and/or scenario objects, such as displaying alert information on the display terminal interface 210. In other cases, the basic processing in gateway 202 may directly cause, for example, an alert message to be displayed on the Alert Display.

In the example described with FIG. 2, the control objects contain attributes that dictate system response to an incoming alarm. Basic functionality such as alert generation, event logging, etc. may be described by the control object itself. Initiation of advanced functions (e.g., alert suppression, alert escalation, event correlation, and thresholding) may be handled through scenario objects initiated by a control object. Finally, the alarm incident received from network element 201 is processed in accordance with the management behavior defined for FMS 200 (e.g., through the control and scenario objects), and FMS 200 responds in accordance with the pre-defined management policies of the system (e.g., to display a fault alert and/or perform other management behavior as specified by the management policies).

While the above example utilizes control objects and scenario objects to implement a policy that defines a desired management behavior for the fault management system, policies may be implemented without utilizing such control objects and scenario objects. More specifically, in traditional MSs, management policies are commonly divided into Control Objects for performing basic management tasks and Scenario Objects for performing more advanced management tasks (such as correlation, etc.). Such a division of management tasks into Control Objects and Scenario Objects is typically a result of the management system platform being implemented. More recently, management systems are available in which the functionality of Control Objects and Scenario Objects are implemented in management policies, which may not distinguish between basic and advanced processing.

Figure 3:
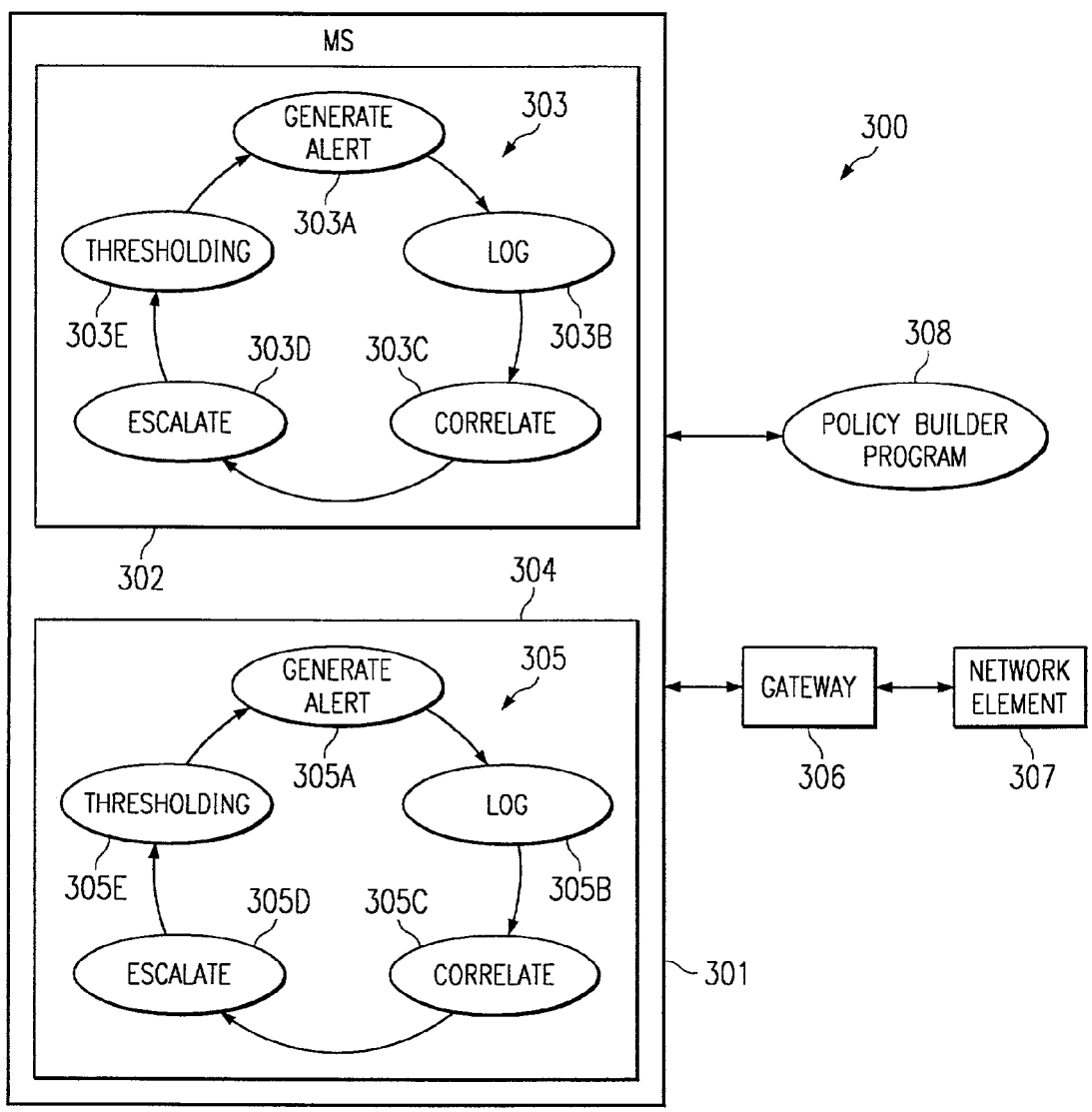
FIG. 3 shows an example of a fault management system having traditional management policies implemented thereon.

In existing MSs, policies that define management behavior execute according to a fixed, inflexible process flow. An example of such traditional policies is shown as being implemented in the fault management system 300 of FIG. 3. Fault management system 300 comprises one or more network elements, such as network element 307, which are communicatively coupled to one or more gateways, such as gateway 306. As in the environments described above in conjunction with FIGS. 1 and 2, gateway 306 receives incidents (or messages) from network element 307. Gateway 306 may normalize the received messages and pass them to MS 301 for processing thereby in accordance with one or more policies executing on MS 301. In the example of FIG. 3, policies 302 and 304 have been implemented on MS 301. Policy builder program 308 is communicatively coupled to (or executing on) MS 301 to enable a user to create a policy for controlling management behavior, such as policies 302 and 304.

Each of policies 302 and 304 make certain management tasks available for implementation by a user. For instance, in the example of FIG. 3, policies 302 and 304 each make such management tasks as alert generation, event logging, event correlation, alert escalation, and thresholding available for implementation by a user. Policies 302 and 304 execute according to a fixed, inflexible process flow, which may not be modified by a user. For example, policy 302 executes according to process flow 303. That is, in execution, policy 302 steps sequentially through alert generation task 303A, event logging task 303B, event correlation task 303C, alert escalation task 303D, and finally thresholding task 303E. Similarly, policy 304 executes according to process flow 305, wherein in execution its execution policy 304 steps sequentially through alert generation task 305A, event logging task 305B, event correlation task 305C, alert escalation task 305D, and finally thresholding task 305E. Thus, each time policy 302 or 304 is invoked (e.g., responsive to a particular message being received from network element 307 that causes invocation of such policy), their respective process flow is executed.

Suppose for example, that in policy 302 a user has specified (e.g., in creating policy 302 via policy builder program 308) that upon an alarm message "A1" being received from network element 307 such event is to be logged to a database, but does not specify that any other management tasks are to be performed. Now suppose that an alarm message A1 is received from network element 307; policy 302 is invoked, which causes it to step through its process flow 303. That is, policy 302 will first determine whether to generate an alert at operational step 303A. Because the user has not specified that an alert is to be generated by this policy 302, policy 302 will determine that no alert is to be generated at step 303A. Process flow 303 next advances its execution to operational step 303B, whereat policy 302 determines whether to perform event logging. Since the user has specified that event logging is to be performed by policy 302, it will execute in operational step 303B to log the event to a database, as desired by the user.

Thereafter, process flow 303 continues to sequentially step through each of the remaining operational steps 303C–303E to determine whether any action is necessary at each step. It should be recognized that such operational flow 303 is inefficient and unnecessarily consumes processing resources in performing operational steps 303A and 303C–303E, as the only operational step that the user desires to be performed by policy 302 is step 303B (for event logging). Thus, while a user may select to perform any of the management tasks made available by management policy 302, process flow 303 fully executes irrespective of how many of the management tasks are actually implemented by a user.

Continuing with the above example of policy 302, suppose that the user desires to configure such policy to perform event logging and then generate an alert (in that order) upon detection of alarm A1 for network element 307. Such an option is generally not available to the user, as process flow 303 is fixed and inflexible. More specifically, process flow 303 dictates that policy 302 may first generate an alert at step 303A and then perform event logging at step 303B, and such process flow may not be altered by a user. That is, in traditional fault management systems, a user may not define a process flow for performing management tasks within a policy, but instead is limited to performing management tasks according to the fixed operational flow for policies.

Further, continuing with the above example, suppose a user desires to have two different types of event correlation performed by policy 302 upon detection of alarm A1 for network element 307. Such an option is not available to the user, as process flow 303 in this example provides for only one correlation task (i.e., at operational step 303C). That is, a user may not modify process flow 303 to include an additional management task, such as the performance of an additional correlation. Thus, the inflexibility of traditional policies are inefficient (in that they may unnecessarily consume processing resources) and undesirably limit a user's ability to control the management behavior implemented by such policies.

Figure 4:
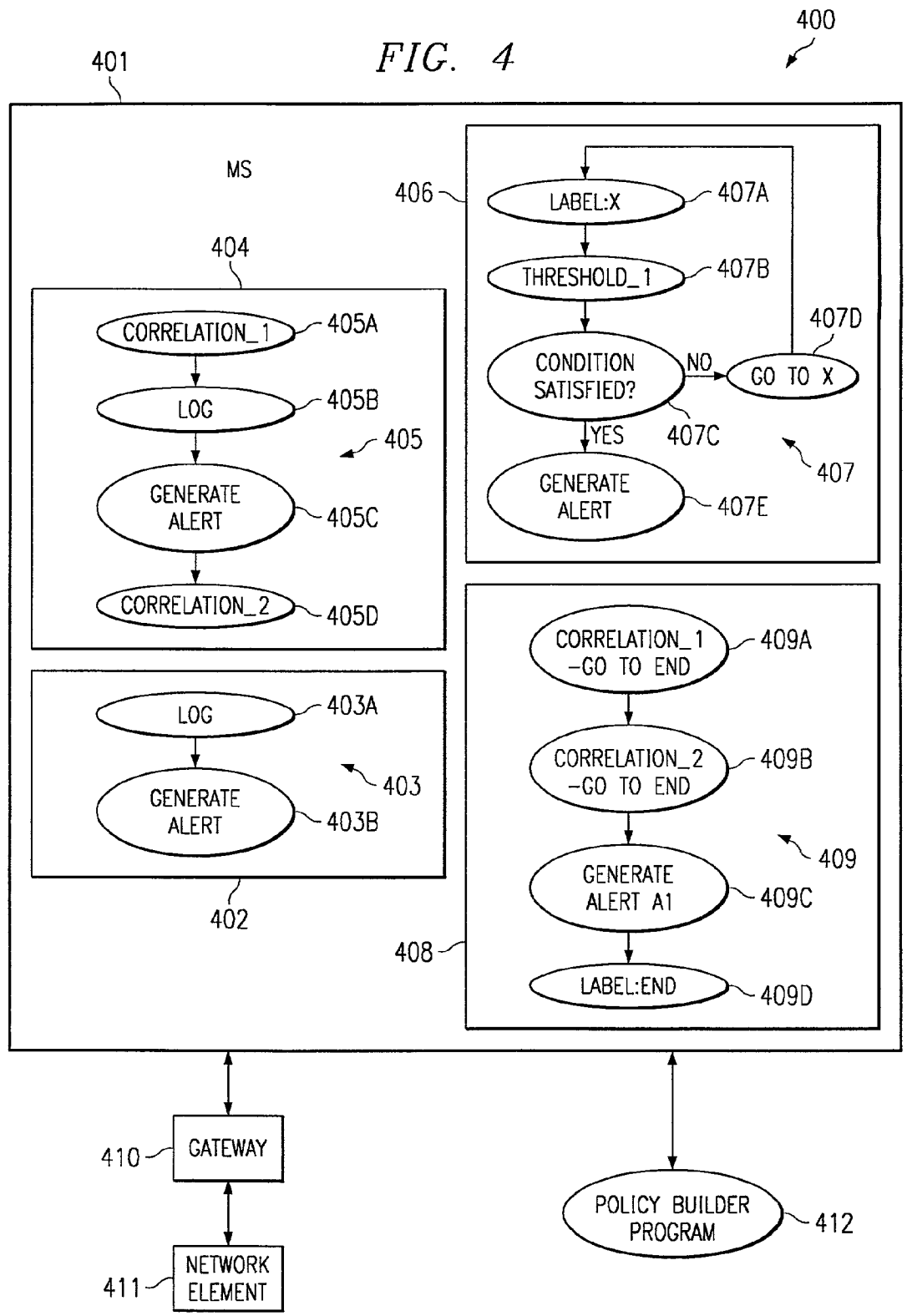
FIG. 4 shows an exemplary fault management system implementing exemplary policies for defining management behavior in accordance with embodiments of the present invention.

Turning now to FIG. 4, an exemplary fault management system 400 is shown, in which policies for defining management behavior may be implemented in accordance with embodiments of the present invention. Fault management system 400 comprises one or more network elements, such as network element 411, which are communicatively coupled to one or more gateways, such as gateway 410. As in the environments described above in conjunction with FIGS. 1–3, gateway 410 may receive incidents (or messages) from network element 411. Gateway 410 may normalize the received messages and pass them to MS 401 for processing thereby in accordance with one or more policies executing on MS 401. In the example of FIG. 4, policies 402, 404, 406, and 408 have been implemented on MS 401. Policy builder program 412 is communicatively coupled to (or executing on) MS 401 to enable a user to create a policy for controlling management behavior, such as policies 402, 404, 406, and 408. Further, in accordance with a preferred embodiment of the present invention, a user may control the process flow of such policies when creating them via policy builder program 412.

In a preferred embodiment, each of policies 402, 404, 406, and 408 include management tasks that are to be executed according to a process flow defined by a user. For example, policy 402 comprises user-defined process flow 403 for performing management tasks at operational steps 403A and 403B. More specifically, in creating policy 402 via policy builder program 412, the user has specified that policy 402 is to execute to perform event logging at operational step 403A and alert generation at operational step 403B. For instance, suppose that a user desires to have policy 402 invoked upon an alarm message "A1" being received from network element 411. That is, the user desires to have such event logged to a database and then generate an alert upon alarm message A1 being received for network element 411. Policy 402 may be created having process flow 403 for performing the desired management tasks.

As described above, traditional fault management systems do not allow a user to define such a desired process flow, but instead the user must define management behavior within the constraints of a fixed, inflexible process flow. Additionally, traditional policies generally have a process flow that steps through each possible management task, which may unnecessarily consume processing resources of the management system. By contrast, a preferred embodiment of the present invention enables a user to define a desired process flow for a policy that does not comprise unnecessary (or undesired) processing steps. For instance, exemplary policy 402 comprises process flow 403 that performs event logging 403A and then alert generation 403B, and does not step through processing of any further undesired management tasks. Accordingly, a user may define a process flow for a policy that does not unnecessarily consume processing resources of the management system in its execution.

Policy 404 provides a further example of a policy that may be defined by a user (e.g., via policy builder program 412) and implemented on MS 401. Policy 404 comprises user-defined process flow 405 for performing management tasks at operational steps 405A–405D. More specifically, in creating policy 404 via policy builder program 412, the user has specified that policy 404 is to execute to perform a first type of event correlation (named "Correlation_1") at operational step 405A, event logging at operational step 405B, alert generation at operational step 405C, and then a second type of event correlation (named "Correlation_2") at operational step 405D. For instance, suppose that a user desires to have policy 404 invoked upon an alarm message "A2" being received from network element 411. That is, the user desires to have such management tasks defined by process flow 405 performed upon alarm message A2 being received for network element 411. Policy 404 may be created having process flow 405 for performing the desired management tasks responsive to detection of alarm message A2 for network element 411.

As illustrated by exemplary policy 404, a preferred embodiment enables a user to specify process flow that includes any desired management tasks to be performed in an order as desired by the user. As described above, traditional policies generally have a fixed process flow that the user cannot alter to add a desired management task thereto. For instance, if a traditional process flow allowed for performance of correlation as one operational step, the user could not modify the process flow to add an additional correlation operation within the policy flow. However, a preferred embodiment of the present invention provides more flexibility to a user in that a user may define a desired process flow for a policy. The user may specify any desired process flow for performing management tasks. For instance, for exemplary policy 404, the user has specified a process flow that includes performance of two different correlation operations (Correlation_1 and Correlation_2).

Policy 406 provides a further example of a policy that may be defined by a user (e.g., via policy builder program 412) and implemented on MS 401. Policy 406 comprises user-defined process flow 407 for performing management tasks at operational steps 407A–407E. This exemplary policy illustrates that in defining the process flow of a policy according to a preferred embodiment, a user is not limited to defining a sequential process flow, but may instead define a process flow that includes "jumps," loops, and/or other non-sequential flow-types that are well known in the programming arts. For instance, exemplary process flow 407 of policy 406 has been defined to include a label "X," which identifies an operational position 407A within process flow 407. Execution of process flow 407 advances from operational position 407A to operational step 407B, whereat a thresholding operation identified as "Threshold_1" is performed.

Operation then advances to operational step 407C, whereat it is determined whether a user-specified condition is satisfied. For example, at step 407C it may be determined whether an appropriate threshold level was achieved in step 407B. For instance, gateway 410 may periodically poll network element 411 for a response therefrom. If a response is not received from network element 411, then policy 406 may be invoked. Suppose the user desires to generate an alert for network element 411 being non-responsive only if it fails to respond to three consecutive polls by gateway 410.

As described above, execution of policy 406 begins at operational position 407A, and advances to operational step 407B to perform thresholding. "Threshold_1" performed at operational step 407B determines whether the threshold level of three consecutive non-responses has been achieved for network element 411. Thus, upon policy 406 first being invoked for non-responsiveness of network element 411, Threshold_1 advances a counter and determines that the specified threshold level (of three consecutive non-responses) has not been achieved. Accordingly, it may be determined in operational step 407C that the threshold level is not achieved, and therefore execution advances to step 407D, which directs the operation to return to operational position 407A. That is, a jump statement of "go to X" may be included in operational step 407D, which causes execution to return to the operational position 407A identified by label X. Once it is determined at operational step 407C that the threshold level has been achieved in operational step 407B, then execution advances to step 407E, whereat an alert is generated to notify the system administrator of the non-responsiveness of network element 411.

As another example of a condition that may be specified at operational block 407C, it may be determined whether the time is between the hours of 9:00 a.m. and 5:00 p.m. That is, suppose a user desires that alerts relating to the non-responsiveness of network element 411 be generated only during certain hours of the day (such as between 9:00 a.m. and 5:00 p.m.). Thus, if determined at operational step 407C that the time is between 9:00 a.m. and 5:00 p.m., execution may advance to step 407E to generate an alert (assuming that the threshold level of Threshold_1 has been achieved). On the other hand, if it is determined at operational step 407C that the current time is not between 9:00 a.m. and 5:00 p.m., execution may advance to step 407D, which causes the process flow to jump back to operational position 407A identified by label X.

Policy 408 provides a further example of a policy that may be defined by a user (e.g., via policy builder program 412) and implemented on MS 401, which has a non-linear process flow defined by a user. Policy 408 comprises user-defined process flow 409 for performing management tasks at operational steps 409A–409D. More specifically, execution begins at operational step 409A, whereat a first type of correlation identified as "Correlation_1" may be performed, if appropriate. That is, conditions may be specified within Correlation_1 such that Correlation_1 is executed upon those conditions being satisfied. If Correlation_1 is executed in step 409A, then a jump to operational position 409D identified by label "End" is performed. That is, a "go to End" statement may be executed by operational step 409A upon Correlation_1 being performed, which effectively bypasses the other management tasks of process flow 409 to advance to operational position 409D identified by the "End" label.

If Correlation_1 is not performed in operational step 409A, then the jump statement "go to End" is not performed and execution of process flow 409 advances to operational step 409B, whereat a second type of correlation identified as "Correlation_2" may be performed, if appropriate. That is, conditions may be specified within Correlation_2 such that Correlation_2 is executed upon those conditions being satisfied. If Correlation_2 is executed in step 409B, then a jump to operational position 409D identified by label "End" is performed. That is, a "go to End" statement may be executed by operational step 409B upon Correlation_2 being performed, which effectively bypasses the other management tasks of process flow 409 to advance to operational position 409D identified by the "End" label.

If Correlation_2 is not performed in operational step 409B, then the jump statement "go to End" is not performed and execution of process flow 409 advances to operational step 409C, whereat an alert "A1" is generated. Thus, if either Correlation_1 or Correlation_2 are performed, then alert "A1" is not generated (as execution jumps to step 409D upon execution of either of such correlation tasks), but if neither Correlation_1 nor Correlation_2 are executed, then an alert A1 is generated in operational step 409C.

As illustrated by exemplary policies 406 and 408 above, a preferred embodiment enables a user to define a policy process flow that may not necessarily be a linear process flow, but may instead include jumps and/or loops, etc. As described above, traditional policies generally have a fixed process flow that the user cannot alter to define such non-linear process flows as defined in exemplary policies 406 and 408. Accordingly, a preferred embodiment of the present invention provides a user much more flexibility in defining the desired management behavior to be implemented within a fault management system than is available in traditional fault management systems.

According to a preferred embodiment, policies are defined/represented in the fault management system as objects. The user may specify particular attributes of a policy object to define the management tasks to be performed by such policy, as well as controlling the process flow of the policy. Turning to FIG. 5, an exemplary policy object 501 that may be defined by a user in accordance with a preferred embodiment of the present invention is shown. Policy object 501 may have several attributes that are definable by a user (e.g., via policy builder program 412 of FIG. 4). For instance, in the example of FIG. 5, policy object 501 includes a policy name attribute 502, policy identifying attribute(s) 503, process list attribute(s) 504, and behavior list attribute(s) 505. Policy name attribute 502 may provide a user-specified name for policy 501. In a preferred embodiment, the user may provide a descriptive name for the policy 501, without being concerned that such policy name is easily identifiable (or searchable) for received alarms for which the policy is to be invoked. For instance, in this example, policy attribute 501 has been named "Correlation Policy For Folsom Router."

The user need not worry about selecting a name for the policy that may be identifiable for particular alarms for which the policy is to be invoked because, in a preferred embodiment, policy 501 includes identifying attribute(s) 503 that are used for identifying when such policy is to be invoked. For instance, identifying attributes 503 specify alarm name "A1," managed object (MO) name "MO1," and location "Folsom, Colo." Thus, such information identifies that policy 501 is to be invoked upon an alarm A1 being detected for managed object MO1 located in Folsom, Colo. Any type of identifying information may be specified by the user in identifying attributes 503 to enable a user (e.g., system administrator) to specify the conditions in which policy 501 is to be invoked. Accordingly, identifying attributes 503 may be used when searching for policies to be invoked responsive to detected conditions within the network, such as detected alarms from network element(s).

Accordingly, because identifying attributes 503 are included for identifying the conditions in which policy 501 is to be invoked, the user is free to provide a more descriptive name for the policy. Traditional policies are generally identified for invocation based upon their name, which dictates that such traditional policies often have names that are not user-friendly and/or descriptive. For example, in traditional fault management systems policy 501 would typically be named "A1MO1Folsom", such that the policy name includes the identifying information as to when policy 501 is to be invoked. A preferred embodiment of the present invention enables a more descriptive and/or user-friendly name (e.g., a natural language name that may be more meaningful to a system administrator) and provides the information for identifying when policy 501 is to be invoked in identifying attributes 503 of the policy object.

Policy object 501 also includes a user-defined process list 504 as an attribute of such policy object. The user may specify in such policy list attribute the management tasks (or behaviors) that are to be performed upon invocation of the policy defined by object 501. The exemplary process list included in attribute 504 of policy object 501 corresponds to policy 404 of FIG. 4. Thus, policy object 501 of FIG. 5 may define policy 404 of FIG. 4. As described above, the user may specify the process flow of such policy. For instance, the process flow of a policy may be specified by the arrangement of management tasks (e.g., other policies) in the process list attribute 504. Additionally, in certain embodiments the user may utilize certain process flow control tools (such as "Go to" and/or "Loop" commands) in the process list 504 to further control the operational flow of the policy defined by policy object 501. Examples of defining a policy using a policy builder program in accordance with a preferred embodiment of the present invention are further described in concurrently filed application entitled "SYSTEM AND METHOD FOR DEFINING MANAGEMENT POLICIES FOR MANAGING NETWORK ELEMENTS," assigned Ser. No. 09/945,372 and concurrently filed application entitled "USER-FRIENDLY SYSTEM AND METHOD FOR DEFINING POLICIES FOR MANAGING NETWORK ELEMENTS," assigned Ser. No. 09/945,112, the disclosures of which have been incorporated herein by reference. For instance, as described in concurrently filed application entitled "SYSTEM AND METHOD FOR DEFINING MANAGEMENT POLICIES FOR MANAGING NETWORK ELEMENTS," the policy builder program may present a user-interface with which the user may interact to select predefined tools (e.g., policy templates) to be included in the process list, and the user may further control the arrangement of such predefined tools in the process list to control the process flow of the policy.

A preferred embodiment allows for nesting of management policies. For instance, a user may create one management policy and then use it in defining another management policy. For example, the management tasks (or behaviors) included in process list 504 of policy object 501 may each be a defined policy that is to be invoked according to the process flow specified by the user. Thus, in a preferred embodiment, a policy may include other policies in its processing list, which in turn may have policies included in their processing lists. In a preferred embodiment, atomic policies (that provide a basic function and have no other policies embedded within them) are defined by attributes and a "Method." The Methods can be any type of computer-executable process, such as a Java, C++, or other type of computer-executable process. In certain implementations, such computer-executable process may be run from a bus, such as the CORBA bus described hereafter in conjunction with the exemplary environment shown in FIG. 6. When a policy is invoked, the Method is the mechanism that actually does the work to get the job done based on the parameters pass to it. The parameters are the attribute values set by the user when defining the policy, and other attributes that are populated at runtime, such as the incoming alarm name or MO name. Typically, certain Methods are provided by a vendor within the management system product, but Methods may also be developed by a customer for use in the management system.

A further user-definable attribute that may be included in policies of a preferred embodiment is a behavior list attribute. An exemplary behavior list attribute 505 is included in policy object 501 of FIG. 5. Such a behavior list may specify management tasks (or behaviors) that are to be triggered responsive to encountered events related to the policy, which are not included in (or are external to) the defined process flow for performing the management tasks defined by process list 504. For instance, upon policy 501 being invoked (e.g., responsive to alarm A1 being detected for MO1 in Folsom, Colo.), management tasks may be performed in accordance with the defined process list 504. Once such management tasks are invoked, external events may act upon those management tasks. For instance, a user (e.g., system administrator) may perform actions that are related to the invoked management tasks.

One example of such an external event that may act upon management tasks invoked by policy 501 is a user manually clearing an alert generated by policy 501 from the alert display. For instance, process list 504 specifies that upon alarm A1 being detected for MO1 located in Folsom, Colo., certain management tasks are performed (according to a defined process flow), including generating an alert. A user manually clearing the generated alert is an event that is not a part of the normal process flow of the process list 504 defined for policy 501. However, a user may desire to define a particular action that is to be taken if an event is detected relating to an alert generated by policy 501. For instance, suppose a user desires that only a particular user is to be allowed to clear an alert generated by policy 501 (e.g., due to the importance of the network element to which the alert relates), the user may define in behavior list attribute 505 that upon detecting a user attempting to manually clear the alert generated by policy 501 that a policy named "Manual_Clear" is to be triggered, which executes to determine whether such user is a particular user having sufficient authority to perform the manual clear (e.g., based on the user's login identification, etc.).

As another example of an event that may be detected relating to management tasks invoked by policy 501, a user may acknowledge an alert generated by such policy. For instance, upon an alert being generated to an alert display, a message may be presented requesting user input acknowledging recognition by the user of such alert. The user may desire that only a particular user (having sufficient authority) is to acknowledge receipt of such alert to ensure that a sufficiently authorized user is made aware of the alert. Accordingly, the user may specify a policy "Alert Acknowledge" in behavior list 505, which is invoked upon a user attempting to acknowledge an alert generated by policy 501 to ensure that the user is sufficiently authorized to acknowledge such alert.

As still another example of an event that may be detected relating to management tasks invoked by policy 501, a user may manually change the severity of an alert generated by such policy. For instance, upon an alert being generated to an alert display, a user may interact with the alert display to manually alter the alert's severity. The user may desire that only a particular user (having sufficient authority) is to alert the alert's severity to ensure that a sufficiently authorized user is the one performing such severity change. Accordingly, the user may specify a policy "Change Severity" in behavior list 505, which is invoked upon a user attempting to change the severity of an alert generated by policy 501 to ensure that the user is sufficiently authorized to perform such change. It should be recognized that various types of events other than the examples provided above may be detected relating to management tasks invoked by policy 501 for which policies may be specified in behavior list attribute 505 to be invoked responsive to detection of such events.

As with process list 504, the management tasks included within behavior list 505 may include other policies. Thus, nesting of policies within such behavior list attribute may be utilized in a preferred embodiment. For instance, the management tasks shown in exemplary behavior list 505 may each be a policy that may be invoked by the policy defined by object 501.

In view of the above, embodiments of the present invention may enable policies to be defined by a user in a manner such that the user may specify the process flow of the policy. Preferably, policies are defined as objects having attributes that may be specified by a user to control the management tasks to be performed by a policy, as well as the process flow of the policy in performing such management tasks. Embodiments of the present invention may be implemented in various types of fault management systems, such as the exemplary fault management environments described in FIGS. 1 and 2 above. More specifically, as shown in FIG. 4, management policies may be implemented on a centralized MS in certain embodiments of the present invention.

Figure 6:
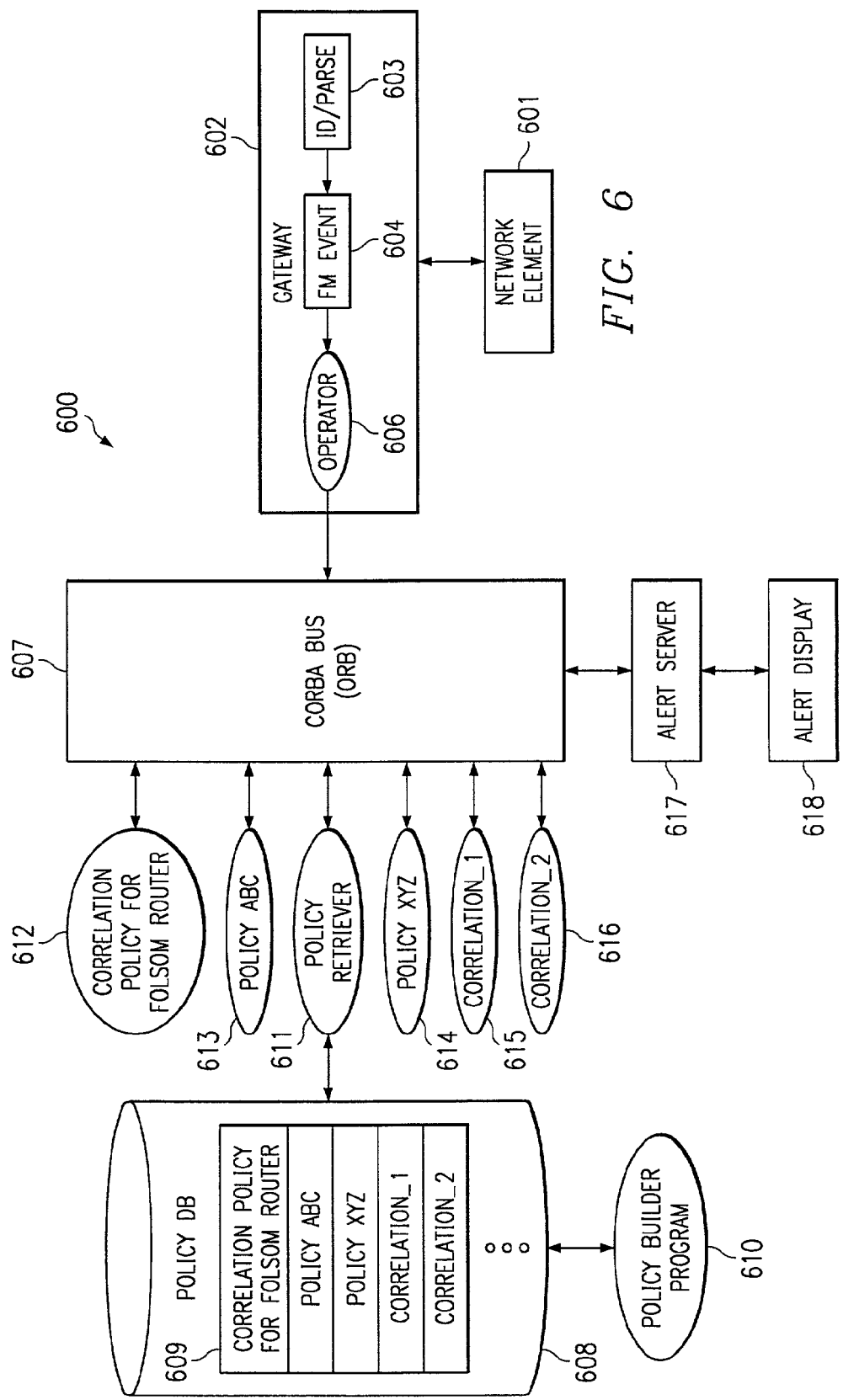
FIG. 6 shows an example of a preferred fault management environment in which management policies of embodiments of the present invention may be implemented.

An example of a more preferred manner of implementing such management policies is shown in FIG. 6, wherein management policies may be implemented in a distributed manner. FIG. 6 shows an exemplary fault management environment 600, which includes network element 601 that is communicatively coupled to gateway 602. Policy database 608 is also included, which stores policy object 609, such as "Correlation Policy For Folsom Router" (defined as policy object 501 in FIG. 5), "Policy ABC," "Policy XYZ," "Correlation_1" (which is used in policy object 501 of FIG. 5), and "Correlation_2" (which is also used in policy object 501 of FIG. 5). Policy builder program 610 is communicatively coupled to database 608 such that a user may interact with policy builder program 610 to create new policy objects 609 and/or modify existing policy objects 609 (which, as described above, includes enabling a user to create/modify the process flow of a policy).

A policy retriever process 611 is preferably executing within fault management environment 600, which is operable to invoke instances of the appropriate policies in response to conditions, such as alarms, being detected within the managed network. As an example, suppose that network element 601 is a router located in Folsom, Colo. that is represented within fault management environment 600 by an object named "MO1" (e.g., is defined as MO1 in a MIB of fault management environment 600, which is not shown in the example of FIG. 6). Further suppose that an alarm A1 is received by gateway 602 from network element 601. In this exemplary embodiment, gateway 602 may apply ID and Parse rules 603 to the received message (as described above in conjunction with exemplary gateway 202 of FIG. 2) in order to, for example, parse out the name and location of the network element, as well as the name of the alarm received therefrom. Gateway 602 may then generate a fault management (FM) event 604 responsive to such alarm A1 being received from network element 601.

FM event 604 triggers operator 606, which interacts with a remote invocation system, such as CORBA bus 607, to identify whether any policies are to be invoked responsive to the received alarm. Various types of remote invocation systems may be utilized, including without limitation CORBA and JAVA RMI. Remote invocation systems, such as CORBA and JAVA RMI are well known in the art, and any suitable remote invocation system now known or later discovered may be utilized in fault management environments of certain embodiments of the present invention. In this example, a CORBA bus 607, which is commonly known as an ORB, is utilized. Operator 606 is operable to communicate a request that includes suitable information parsed (and/or added) by gateway 602 to CORBA bus 607, which then acts as a request broker to determine where the request should be routed. In this implementation, CORBA bus 607 routes the request to policy retriever process 611, which determines whether a policy should be invoked for the alarm. More specifically, the identifying attributes of the defined policy objects are searched by policy retriever 611 to determine whether a policy is identified for invocation responsive to the received alarm.

In this example, the identifying attributes 503 (see FIG. 5) of "Correlation Policy For Folsom Router" are satisfied, and therefore policy retriever 611 invokes an instance of such policy. Of course, various instances of policies may be distributed about CORBA bus 607 and any number of such instances may be executing in parallel. For instance, the example of FIG. 6 shows that policy instances 612–616 have been invoked by policy retriever 611 and made available via CORBA bus 607.

In this example, an alert server 617 is also communicatively coupled to CORBA bus 607, such that policy instances 612–616 may generate alerts via CORBA bus 607. More specifically, one or more alert displays, such as alert display 618, may be communicatively coupled to alert server 617, and one or more of policy instances 612–616 may generate an alert to alert display 618 by communicating such alert to alert server 617 via CORBA bus 607.

In view of the above, it should be recognized that embodiments of the present invention enable a user great flexibility in configuring the management behavior of a management system for managing elements of a communication network. More specifically, embodiments of the present invention enable a user to not only specify the particular behavior that a management policy is to implement (e.g., which may use other policies), but a user may also specify the process flow that is to utilized by the management policy in performing the desired behavior. Thus, a user may configure the management actions that are to be performed by a management policy and may also configure the specific process flow of the management policy.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for defining a management policy for controlling behavior of a management system, where the management system manages at least one network element of a communication network, said method comprising:
   executing a program on a processor-based device that presents a user interface for defining said management policy, said management policy being capable of defining how network elements are managed and comprising a set of stored parameters that determine decision-making in a management system;
   receiving input from a user identifying management action to be performed by said management policy; and
   receiving input from a user specifying a modifiable process flow for said management policy to utilize in performing said management action.

2. The method of claim 1, wherein said management policy is invoked for performing said management action responsive to detection of a fault condition for the at least one network element managed by said management system.

3. The method of claim 2, wherein said management policy identifies said fault condition and said at least one network element for which said management action is to be invoked.

4. The method of claim 1, wherein said management policy is represented by a software object stored to a data storage device communicatively accessible by said management system.

5. The method of claim 1, wherein said defining said management policy includes creating a new management policy.

6. The method of claim 1, wherein said defining said management policy includes modifying an existing management policy.

7. The method of claim 1, wherein the receiving of inputs from a user each further comprise receiving input from a user for arranging at least one action to be performed for said management action in a process list to specify said process flow.

8. The method of claim 1, further comprising storing said management action to a software object defining said management policy.

9. The method of claim 8, wherein said storing further comprises storing said management action to a process list attribute of said software object, wherein said process list attribute identifies said process flow for said management policy.

10. A method for defining a management policy for controlling behavior of a management system, said method comprising:
    executing a program on a processor-based device that presents a user interface for defining said management policy;
    receiving input from a user identifying management action to be performed by said management policy; and
    receiving input from a user specifying a process flow for said management policy to utilize in performing said management action,
    wherein said management action includes at least one type of action selected from a group consisting of fault correlation, thresholding, logging information related to a fault, alert generation for a fault, suppression of an alert, escalation of an alert, and any combination thereof.

11. The method of claim 10, wherein said process flow identifies an order of execution of actions included in said management action.

12. A management system managing at least one network element of a communication network, the management system comprising:
    software program stored to a data storage device, said software program executable to present a user interface for defining a management policy for controlling behavior of said management system, the management policy being capable of defining how network elements are managed and comprising a set of stored parameters that determine decision-making in a management system;
    at least one processor-based device operable to execute said software program; and
    at least one input device communicatively coupled to said at least one processor-based device to allow input from a user to said software program to identify management action to be performed by said management policy and to specify a modifiable process flow for said management policy to utilize in performing said management action.

13. The system of claim 12, further comprising at least one processor-based device operable to execute said management policy to control behavior of said management system in managing at least one network element of a communication network.

14. The system of claim 12, wherein said data storage device comprises at-least one storage device selected from a group consisting of random access memory (RAM), disk drive, floppy disk, Compact Disc (CD), Digital Versatile Disc (DVD), any other type of optical storage medium, and any combination thereof.

15. The system of claim 12, wherein said management policy is represented by a software object stored to a data storage device communicatively accessible by said management system.

16. The system of claim 12, wherein said software program is operable to receive said input from a user comprising input for arranging at least one action to be performed for said management action in an order that specifies said process flow.

17. A management system comprising:
    software program stored to a data storage device, said software program executable to present a user interface for defining a management policy for controlling behavior of said management system;
    at least one processor-based device operable to execute said software program; and
    at least one input device communicatively coupled to said at least one processor-based device to allow input from a user to said software program to identify management action to be performed by said management policy and to specify a process flow for said management policy to utilize in performing said management action,
    wherein said management action includes at least one type of action selected from the group consisting of fault correlation, thresholding, logging information related to a fault, alert generation for a fault, suppression of an alert, escalation of an alert, and any combination thereof.

18. The system of claim 17, wherein said process flow identifies an order of execution of actions included in said management action.

19. A computer program product comprising:
    a computer readable medium having computer readable code embodied therein, said computer readable code being capable of causing a processor to:

arrange management actions in a user-defined manner, said user-defined manner dictating a modifiable process flow for a management policy to utilize in performing said management actions upon invocation of said management policy, said management policy being capable of defining how network elements are managed and comprising a set of stored parameters that determine decision-making in a management system, define said management policy having attributes that control behavior of a management system in managing at least one network element of a communication network, said attributes comprising: process list attribute having said management actions included therein.

20. The computer program product of claim 19, wherein said attributes further comprise at least one attribute that identifies a circumstance for which said management policy is to be invoked.

21. The computer program product of claim 20, wherein said circumstance includes identification of a particular type of fault condition for at least one network element.

22. The computer program product of claim 20, wherein said attributes further comprise name attribute specifying a user-defined name for said management policy; wherein said name attribute is not said at least one attribute that identifies said circumstance for which said management policy is to be invoked.

23. A computer program product comprising:
a computer readable medium having computer readable code embodied therein, said computer readable code being capable of causing a processor to:
arrange management actions in a user-defined manner, said user-defined manner dictating a modifiable process flow for a management policy to utilize in performing said management actions upon invocation of said management policy, said management policy being capable of defining how network elements are managed and comprising a set of stored parameters that determine decision-making in a management system,
define said management policy having attributes that control behavior of a management system in managing at least one network element of a communication network, said attributes comprising: process list attribute having said management actions included therein;
wherein said attributes further comprise a behavior list attribute having at least one management action included therein to be performed responsive to an external event detected relating to said management policy.

24. A computer program product comprising a computer readable medium having computer readable code embodied therein, said computer readable code being capable of causing a processor to:
arrange management actions in a user-defined manner, said user-defined manner dictating a modifiable process flow for a management policy to utilize in performing said management actions upon invocation of said management policy, said management policy being capable of defining how network elements are managed and comprising a set of stored parameters that determine decision-making in a management system,
define said management policy having attributes that control behavior of a management system in managing at least one network element of a communication network, said attributes comprising: process list attribute having said management actions included therein;
wherein said external event includes at least one external event selected from a group consisting of a user attempting to manually clear an alert generated by said management policy, a user attempting to acknowledge an alert generated by said management policy, and a user attempting to change the severity of an alert generated by said management policy.

* * * * *